United States Patent
Hayashi et al.

(10) Patent No.: US 10,954,386 B2
(45) Date of Patent: Mar. 23, 2021

(54) SILICONE ADMIXTURE AND CURED PRODUCT OF THE SAME

(71) Applicants: SMP Technologies Inc., Tokyo (JP); Meinan Rubber Ind., Inc., Aichi (JP)

(72) Inventors: Shunichi Hayashi, Tokyo (JP); Toshihiro Okamoto, Aichi (JP)

(73) Assignees: SMP Technologies Inc., Tokyo (JP); Meinan Rubber Ind., Inc., Aichi (JP)

( * ) Notice: Subject to any disclaimer, the term of this patent is extended or adjusted under 35 U.S.C. 154(b) by 0 days.

(21) Appl. No.: 16/424,993

(22) Filed: May 29, 2019

(65) Prior Publication Data
US 2020/0377726 A1    Dec. 3, 2020

(51) Int. Cl.
*C08L 83/04* (2006.01)
*C08K 3/36* (2006.01)
*C08K 5/54* (2006.01)

(52) U.S. Cl.
CPC ............. *C08L 83/04* (2013.01); *C08K 3/36* (2013.01); *C08K 5/54* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 2,890,188 A * | 6/1959 | Konkle | .................... | C08L 83/04 524/492 |
| 3,268,473 A * | 8/1966 | Brown | .................... | C08K 3/26 524/430 |
| 4,360,610 A * | 11/1982 | Murray | .................... | C08L 83/04 523/212 |
| 5,118,754 A * | 6/1992 | Miyakoshi | .............. | C08L 83/04 524/730 |
| 5,132,340 A * | 7/1992 | Evans | ..................... | C08K 9/08 523/209 |
| 5,610,213 A * | 3/1997 | Sumpter | ................. | C08K 5/14 524/267 |
| 5,674,935 A * | 10/1997 | Evans | ..................... | C08G 77/20 524/588 |
| 5,777,002 A * | 7/1998 | Conway | .................... | C08K 9/06 106/287.14 |
| 6,245,875 B1 * | 6/2001 | Wang | ...................... | C08L 83/04 524/588 |
| 2003/0050387 A1 * | 3/2003 | Fujisawa | .................... | F16F 9/30 524/588 |
| 2010/0056715 A1 * | 3/2010 | Wang | ..................... | G09B 23/30 524/588 |
| 2013/0011606 A1 * | 1/2013 | Otomo | .................... | C08L 83/04 428/131 |
| 2016/0369143 A1 * | 12/2016 | Hayashida | .............. | C08K 3/36 |
| 2017/0158821 A1 * | 6/2017 | Todoroki | ................. | C08K 3/20 |

FOREIGN PATENT DOCUMENTS

| | | | |
|---|---|---|---|
| GB | 2335660 A | 9/1999 | |
| JP | 5462425 B | 4/2014 | |
| JP | 2002114869 | 4/2016 | |
| JP | 2016172809 A * | 9/2016 | ............. C08L 83/07 |
| JP | 2018-199877 A | 12/2018 | |
| JP | 2019-085490 A | 6/2019 | |

OTHER PUBLICATIONS

Translation of JP-2016172809, translation generated Oct. 2020, 19 pages. (Year: 2020).*
Extended European Search Report for EP Application No. 19177250, "Silicone Admixture and Cured Product of the Same", date of completion: Nov. 27, 2019.

* cited by examiner

*Primary Examiner* — Robert S Loewe
(74) *Attorney, Agent, or Firm* — Hamilton, Brook, Smith & Reynolds, P.C.

(57) ABSTRACT

It is an object of the present invention to provide a silicone rubber compatible with human bodies. A silicone admixture according to the present invention comprises a millable silicone rubber, a silicone high polymer having no cross-linking site, a vulcanizing agent, and a rubber reinforcing silica. A cured product obtained by curing the silicone admixture has loss tangent (Tan δ) of 0.3 or more and 0.6 or less at 0° C. to 50° C. The millable silicone rubber can be a millable silicone rubber produced in a wet manner and having high tear resistance. The silicone high polymer can be a dimethyl silicone high polymer.

8 Claims, No Drawings

SILICONE ADMIXTURE AND CURED PRODUCT OF THE SAME

TECHNICAL FIELD

The present invention relates to a silicone admixture.

BACKGROUND ART

In recent years, demand for silicone rubbers has grown increasingly, and there is a need for development of silicone rubbers having excellent properties.

Patent Literature 1 discloses a technique for providing a thermosetting silicone rubber composition with high antistatic performance.

CITATION LIST

Patent Literature

[PTL 1]
the Publication of Japanese Patent No. 5462425 (Paragraph [0008])

SUMMARY OF INVENTION

Technical Problem

It is an object of the present invention to provide a silicone rubber compatible with human bodies.

Solution to Problem

In order to solve the above problem, a silicone admixture of the present invention employs the following solutions.

The present invention provides a silicone admixture, comprising a millable silicone rubber, a silicone high polymer having no cross-linking site, a vulcanizing agent, and a rubber reinforcing silica, wherein the silicone admixture is capable of becoming a cured product having loss tangent (Tan δ) of 0.3 or more and 0.6 or less at 0° C. to 50° C., and a cured product of the silicone admixture.

In one aspect of the present invention described above, the silicone high polymer can be a dimethyl silicone high polymer.

In one aspect of the present invention described above, the silicone admixture preferably further comprises an organosilicone based lubricant.

In one aspect of the present invention described above, the vulcanizing agent can be a peroxide based vulcanizing agent.

In one aspect of the present invention described above, the silicone admixture preferably comprises 40 parts or more by weight of the silicone high polymer based on 100 parts by weight of the total of the millable silicone rubber and the silicone high polymer.

In one aspect of the present invention described above, the silicone admixture preferably comprises 0.1 parts or more by weight and 20 parts or less by weight of the rubber reinforcing silica based on 100 parts by weight of the total of the millable silicone rubber and the silicone high polymer.

The silicone admixture of the present invention described above is capable of becoming a cured product having Tan δ of 0.3 or more and 0.6 or less at 0° C. to 50° C. by curing the millable silicone rubber using the vulcanizing agent. Such a cured product has high compatibility with human bodies, and when such a cured product is used in a part intended to be contact with the human skin, comfortable feelings in wear is provided.

The cross-linked millable silicone rubber and a silicone high polymer having no cross-linking site serve as a hard segment and a soft segment, respectively. As a result of adjusting the proportions of these hard and soft segments, a silicone admixture exhibiting desired Tan δ can be obtained.

Advantageous Effects of Invention

With regard to conventional silicone rubber, there has been no need for defining materials based on Tan δ; however, the present invention can provide a silicone rubber as a novel material having the similar mechanical properties to that of the human skin.

DESCRIPTION OF EMBODIMENTS

One embodiment of a silicone admixture according to the present invention, and one embodiment of a cured product of the silicone admixture will be described below.

A cured product of a silicone admixture according to the present embodiment has mechanical loss tangent (Tan δ) of 0.3 or more and 0.6 or less, preferably 0.4 or more and 0.6 or less at 0° C. to 50° C.

The desired value of Tan δ of the cured product of the silicone admixture can be achieved by optimizing the hardness of the millable silicone rubber, and the proportion of the millable silicone rubber to silicone high polymer.

The silicone admixture comprises a rubber component, a vulcanizing agent, and a rubber reinforcing silica. The rubber component is composed of millable silicone rubber and a silicone high polymer having no cross-linking site. The silicone admixture may comprise a lubricant.

The silicone admixture preferably comprises 40 parts or more by weight of the silicone high polymer based on 100 parts by weight of the rubber component. The content of the silicone high polymer is 80 parts or less by weight based on 100 parts by weight of the rubber component.

The millable silicone rubber is a polyorganosiloxane composition containing vinyl groups. The millable silicone rubber is a highly viscous silicone rubber composition as measured in terms of plasticity. The millable silicone rubber is a silicone rubber to be thermally cured after formulating a vulcanizing agent (curing agent) into the silicone rubber. In the silicone admixture, the millable silicone rubber corresponds to a hard segment of the elastomer, and has decisive influence on properties of the silicone admixture as an elastic body.

The millable silicone rubber is preferably a millable silicone rubber having high tear resistance. In the present embodiment, "high tear resistance" is defined as tear strength (crescent)) of approximately 30 N/mm {kgf/cm} or more. The millable silicone rubber having high tear resistance is produced in a wet manner. The millable silicone rubber having high tear resistance has higher tear resistance than tear resistance of typical silicone rubbers produced in a dry manner.

The millable silicone rubber is selected so as to satisfy a hardness such that a cured product of the silicone admixture to be obtained has the desired Tan δ. The hardness of the millable silicone rubber (type A durometer) is preferably 20 or more and 90 or less. The (JIS-A type) hardness of the millable silicone rubber is preferably 20° or more and 90° or less. Selecting a millable silicone rubber having high hardness gives a strong influence on the silicone admixture as an elastic body, and as a result, Tan δ is unlikely to be exhibited. The JIS-A type hardness is determined by a spring type hardness testing machine used in old JIS (JIS K 6301).

The silicone high polymer has no cross-linking site (for example, vinyl groups). The silicone high polymer is dispersed in the silicone admixture. In the cured product of the silicone admixture, the silicone high polymer corresponds to a soft segment of the elastomer, and has decisive influence on properties of the silicone admixture as a viscous substance. There is no contribution by the silicone high polymer to promote the curing (cross-linking) reaction of the millable silicone rubber. The silicone high polymer is preferably a dimethyl silicone high polymer.

The vulcanizing agent is an agent for achieving cross-linking and curing of the millable silicone rubber by heating. The vulcanizing agent is preferably a peroxide based vulcanizing agent. In the silicone admixture, the content of the vulcanizing agent is greater than or equal to an amount (as a theoretical value) required for 100% cross-linking of the millable silicone rubber, and less than or equal to double of this amount. In the silicone admixture, the millable silicone rubber is diluted with the silicone high polymer, thereby reducing the number of cross-linking points in the entirety of these materials. When the amount of the vulcanizing agent is too small, the cross-linking reaction does not proceed, and when the silicone admixture becomes the cured product, desired elasticity is not obtained. Cross-linking sites in the silicone admixture are limited, and therefore, even if a larger amount of the vulcanizing agent is added, an excessive amount of the vulcanizing agent over a certain quantity is not expected to exhibit the reaction promoting effects in response to the excessive amount. An excessive amount of the vulcanizing agent over a certain quantity only dilutes the silicone admixture and is not preferable.

The rubber reinforcing silica is a silica particle for providing a silicone admixture with hardness. The rubber reinforcing silica is dispersed in the silicone admixture. The rubber reinforcing silica does not contribute to the promotion of the cross-linking reaction of the millable silicone rubber. The silicone admixture preferably comprises 0.1 parts or more by weight and 20 parts or less by weight of the rubber reinforcing silica based on 100 parts by weight of the rubber component. Too large an amount of the rubber reinforcing silica results in the dilution of the millable silicone rubber, and as a result, the cross-linking reaction may not proceed. If the amount of silica as a rubber reinforcing agent is large, blushing in deformation is significant. If the amount of rubber reinforcing silica is too small, the silicone admixture cannot retain desired hardness.

The lubricant is an additive for reducing tackiness of the silicone rubber and providing the silicone rubber with slip ability. The lubricant has good stability at a high temperature, and does not degrade in the cross-linking reaction of the millable silicone rubber. The lubricant is preferably an organosilicone based lubricant. The silicone admixture preferably comprises 1 part or more by weight and 6 parts or less by weight of the lubricant based on 100 parts by weight of the rubber component.

The types of the rubber reinforcing silica and the lubricant are appropriately selected such that the rubber reinforcing silica and the lubricant are highly compatible with the rubber component.

The silicone admixture may comprise an additive such as functional minerals, pigments and aroma chemicals as long as the additive does not interfere with the cross-linking reaction of the millable silicone rubber, and in addition, has no influence on Tan δ of the cured product. No influence herein means an extent that the loss tangent (Tan δ) is in the desired range at the desired temperatures of 0° C. to 50° C.

Next, a method for producing a silicone admixture and a cured product of the silicone admixture is described.

The silicone admixture can be produced by using any of known kneading machines such as kneaders and two-roll kneading machines. In the present embodiment, a two-roll kneading machine is employed. The rolls are driven by the respective motors to change the rotational speed of each of the rolls, and thus kneading force is adjusted to be suitable for kneading of the silicone rubber.

A millable silicone rubber and a vulcanizing agent are introduced in the two-roll kneading machine and kneaded. Next, a silicone high polymer is introduced thereto and kneaded therewith. Next, a rubber reinforcing silica and a lubricant are introduced thereto and kneaded therewith. As a result, a silicone admixture is obtained.

The silicone admixture can be heated at 150° C. to 200° C. for 5 minutes to 15 minutes to cross-link the millable silicone rubber to thereby obtain a cured product of the silicone admixture.

The silicone admixture may be shaped by compression molding, injection molding, transfer molding or the like.

EXAMPLE (Materials)

(1) Millable Silicone Rubber

TSE 260-3U, TSE 260-4U, TSE 2297U (manufactured by Momentive Performance Materials Japan LCC)

(2) Silicone High Polymer

TSE 200 (manufactured by Momentive Performance Materials Japan LCC, molecular weight: about 370000)

(3) Vulcanizing Agent

TC 8 (manufactured by Momentive Performance Materials Japan LCC, 2,5-dimethyl-2,5-di-tert-butylperoxy hexane)

(4) Rubber Reinforcing Silica

Nipsil LP (manufactured by Tosoh Silica Corporation, precipitated silica particle (powder))

(5) Lubricant

WS 280 (manufactured by S&S Co., LTD., a mixture (powder) of an organosilicone and an inorganic carrier)

The above materials were used to produce a silicone admixture according to the above embodiment.

The silicone admixture was introduced into a mold, and subjected to compressional heating at 180° C. for 15 minutes to cross-link the millable silicone rubber, thereby obtaining a cured product of the silicone admixture.

The physical properties of the cured product obtained in a manner described above were evaluated. As comparative materials, a typical silicone rubber (manufactured by Momentive/TSE 221-4U) and a typical ethylene propylene diene rubber (EPDM/manufactured by LANXESS AG, Keltan) were provided, and physical properties thereof were evaluated in the same manner. The results are shown in Table 1.

TABLE 1

|  | Example 1 | Example 2 | Example 4 | Comparative Example 1 | Comparative Example 2 | Comparative Example 3 |
|---|---|---|---|---|---|---|
| TSE260-3U (Parts by weight) | 60 | — | — | Silicone | | EPDM |
| TSE260-4U (Parts by weight) | — | 30 | — | | | |
| TSE2297U (Parts by weight) | — | — | 20 | | | |
| TSE200 (Parts by weight) | 40 | 70 | 80 | | | |
| TS8 (Parts by weight) | 0.3 | 0.15 | 0.16 | | | |
| Nipsil LP (Parts by weight) | 3.6 | 0.6 | 0.2 | | | |
| WS280 (Parts by weight) | 1.2 | 0.6 | 0.2 | | | |
| Hardness*1 | 30 | 40 | 90 | — | — | — |
| Hardness*2 | 10° | 2° | 2° | 2° | 40° | 40° |
| Tensile strength*3 | 2.23 MPa | 0.89 MPa | 0.94 MPa | 0.8 MPa | 7.7 MPa | 9.1 MPa |
| Elongation at break*4 | 720% | 750% | 830% | 1110% | 385% | 640% |
| Tan δ*5 | 0.45-0.60 | 0.35-0.55 | 0.30-0.45 | 0.06 | 0.04 | 0.10 |
| Young's modulus | 350 kPa | — | — | — | 822 kPa | — |
| Avoidance of tackiness*6 | O | — | — | — | Δ | — |

*1Type A durometer
*2JIS-A type
*3,4The cured product was punched to obtain a test piece in the form of type-3 dumbbell, and the obtained test piece was used to conduct tensile test according to JIS C 3005. The tensile test was conducted under conditions of tension rate of 500 mm/min and interval between gauge marks of 20 mm to measure tensile strength (MPa) and elongation at break (%).
*5On a test piece having a width of 10 mm and a length of 40 mm, the storage modulus E' and loss modulus E" of the test piece were determined at various measurement temperatures using viscoelasticity measuring apparatus (DMS 6100 manufactured by SII Nano Technology Inc.). The measuring conditions were as follows: measurement mode: tension, frequency: 1 Hz, measurement temperature: −60° C. to 110° C., rate of temperature increase: 5° C./min. The ratio of loss modulus E" to storage modulus E' (E"/E') was defined as Tan δ. Tan δ at 30° C. are shown in Table 1.
*6determined by tactile impression; "0" means good, and "A" means passing.

The viscoelasticity (mechanical Tan δ) of the skin at various portions of a human body are shown in Table 2.

TABLE 2

| Forearm (from elbow to wrist) | 0.43 |
| Palm (palm of a hand) | 0.47 |
| Forehead (brow) | 0.51 |

Source: TAKAHASHI MOTOJI, POLYMERS, volume 33, 1984

Tan δ in Examples 1 to 3 were in a range of 0.3 to 0.6. Tan δ in Comparative Examples 1 to 3 were 0.1 or less. As shown in Table 2, Tan δ of the human skin are approximately 0.5. The silicone admixtures of Examples 1 to 3 have mechanical Tan δ (vibration absorbing ability) similar to mechanical Tan δ of the human skin, and therefore, when the silicone admixtures of Examples 1 to 3 are used in a part intended to be contact with the human skin, natural feelings in wear is provided so as to allow the wearer to have comfortable feelings.

The silicone admixture according to the present embodiment and the cured product of the silicone admixture is suitable for use in members to be contact with human bodies and other living bodies, such as ear plugs, earpieces for earphones, nose pads and temple ends for eyeglasses, sealing members for goggles, and various members of underwear and sportswear.

(Wear Test)

Cured products in the form of an ear plug were produced from each of the silicone admixtures of Example 2 and Comparative Example 1 in Table 1.

Six test subjects were asked to wear each of the ear plugs produced from the silicone admixtures in a manner described above for 3 days (3 to 5 hours per day), and were asked to evaluate feelings in wear according to a five-point scale (5: Very Good, 4: Good, 3: Fair, 2: Poor, 1: Bad). The results are shown in Table 3.

TABLE 3

| Test subject no. | Example 2 | Comparative Example 1 |
|---|---|---|
| 1 | 3 | 3 |
| 2 | 4 | 2 |
| 3 | 5 | 2 |
| 4 | 5 | 3 |
| 5 | 4 | 2 |
| 6 | 3 | 2 |

According to Table 3, it was found that feelings in wear of the ear plugs produced from the silicone admixture of Example 2 (a silicone admixture of the present invention) is better than that of Comparative Example 2 (conventional silicone).

The invention claimed is:

1. A silicone admixture, comprising:
a millable silicone rubber, a silicone high molecular weight polymer having no cross-linking site, a vulcanizing agent, and a rubber reinforcing silica,
wherein the millable silicone rubber is a polyorganosiloxane composition containing vinyl groups,
wherein the silicone admixture comprises 0.1 parts or more by weight and 3.6 parts or less by weight of the rubber reinforcing silica based on 100 parts by weight of the total of the millable silicone rubber and the silicone high molecular weight polymer, and
wherein the silicone admixture is capable of becoming a cured product having loss tangent (Tan δ) of 0.3 or more and 0.6 or less at 0° C. to 50° C. by being heated to cross-link the millable silicone rubber.

2. The silicone admixture according to claim 1, wherein the silicone high molecular weight polymer is a dimethyl silicone high polymer.

3. The silicone admixture according to claim 1, wherein the vulcanizing agent is a peroxide based vulcanizing agent.

4. The silicone admixture according to claim 1, further comprising an organosilicone based lubricant.

5. The silicone admixture according to claim 1, wherein the silicone admixture comprises 40 parts or more by weight of the silicone high molecular weight polymer based on 100 parts by weight of the total of the millable silicone rubber and the silicone high molecular weight polymer.

6. A cured product of the silicone admixture according to claim 1.

7. The silicone admixture according to claim 1, wherein the millable silicone rubber has high tear resistance, tear strength of which is 30 N/mm (kgf/cm) or more.

8. The silicone admixture according to claim 1, wherein a hardness of the millable silicone rubber is 20 or more and 90 or less (type A durometer), or 20° or more and 90° or less (JIS-A type).

* * * * *